No. 880,321. PATENTED FEB. 25, 1908.
D. D. McINTYRE.
WIND MOTOR.
APPLICATION FILED JULY 31, 1907.
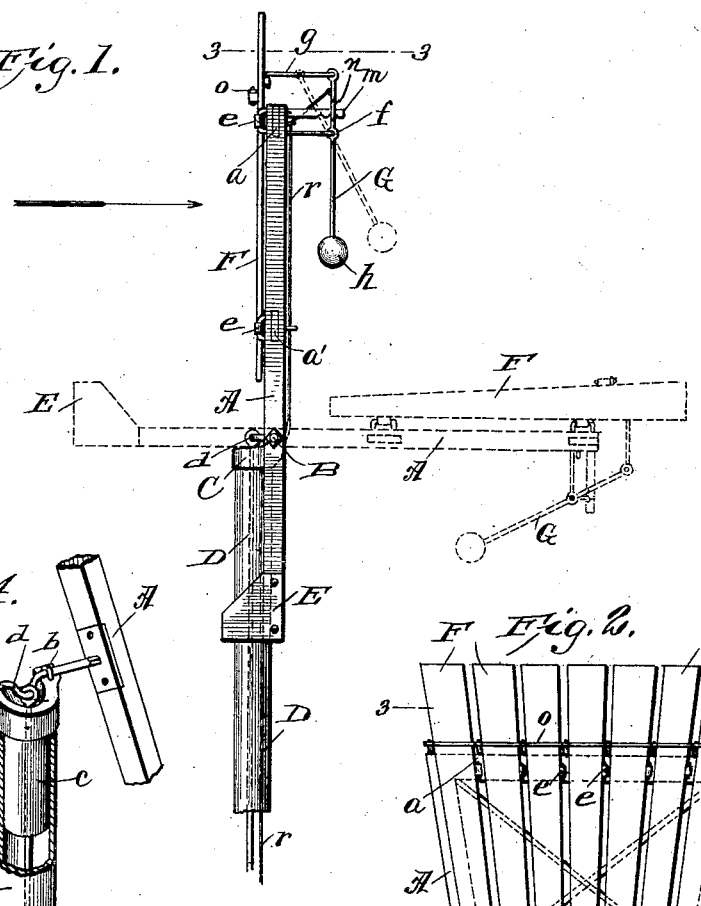
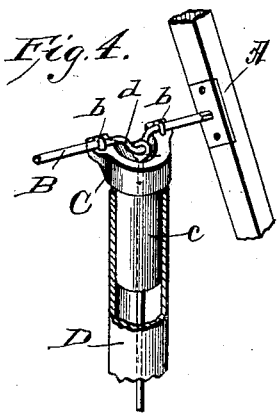
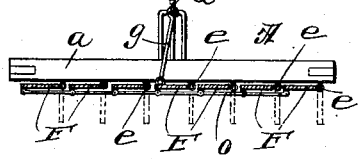
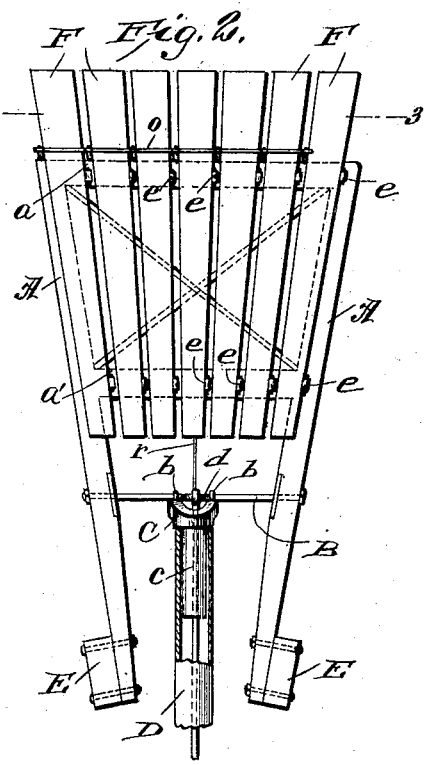
WITNESSES
E. M. Callaghan
Edw. W. Byrn
INVENTOR
Daniel D. McIntyre
BY Munn & Co.
ATTORNEYS

UNITED STATES PATENT OFFICE.

DANIEL DUNCAN McINTYRE, OF BUCKLIN, KANSAS.

WIND-MOTOR.

No. 880,321.　　　Specification of Letters Patent.　　　Patented Feb. 25, 1908.

Application filed July 31, 1907. Serial No. 386,475.

*To all whom it may concern:*

Be it known that I, DANIEL DUNCAN MC-INTYRE, a citizen of the United States, residing at Bucklin, in the county of Ford and State of Kansas, have invented a new and useful Improvement in Wind-Motors, of which the following is a specification.

My invention is in the nature of a wind motor of that type in which there is no rotating wheel, but the force of the wind is applied directly to produce the oscillation of a frame.

The invention consists in the novel construction and arrangement of parts hereinafter described in connection with the drawings, in which Figure 1 is a side elevation. Fig. 2 a front elevation partly in section. Fig. 3 is a cross section on line 3—3 of Figs. 1 and 2, and Fig. 4 is a perspective detail of the upper end of the supporting standard.

In the drawing, A is a frame composed of two divergent side bars connected at their upper ends by two cross bars $a\ a'$. Near the lower convergent ends of the side bars is rigidly connected the transverse shaft B, whose ends are squared and fitted by nuts and plates to the side bars so that said shaft cannot turn in the side bars but has a strong and rigid connection therewith. This shaft is journaled in bearings $b\ b$ upon the top of a collar C attached to a tube section $c$ which enters the top of a pipe D which forms the supporting standard or mast on which my motor is carried. At a point between the bearings $b\ b$ the shaft is bent into a crank $d$ to which is attached the connecting rod of a pump or other mechanism to be operated, said connecting rod passing down through the collar C and the tubular standard to a suitable point below.

To the lower ends of the side bars are attached two heavy weights E E. The wind motor is designed to oscillate vertically about the axis of shaft B, from a nearly horizontal position to a vertical position. The wind effects the direct deflection of the frame backward and away from the wind, as seen in Fig. 1, in dotted lines, and the weights E restore the frame to the vertical position again. To render the above described action automatic and continuous, a series of blades F are hinged at one longitudinal edge $e$ to the cross bars of the frame and to the outer or swinging edge of each blade a transverse bar $o$ is loosely coupled so that when this bar is moved longitudinally in one direction it will turn the blades flat face to the wind and when moved in the other direction it will turn the blades edge wise to the wind. When the blades have their flat faces to the wind the force of the latter tilts the whole frame toward the horizontal position and when the blades are turned edge wise to the wind, they then offer practically no resistance to the wind and the weights bring the frame back to the vertical position again.

To make the change in the plane of the blades at the end of each stroke, a lever G is fulcrumed at $f$ to an off-setting support from the upper cross bar. The upper end of this lever is connected by a link bar $g$ with the free edge of one of the blades and the other and lower end of said lever is provided with a weight $h$. When the main frame is vertical this weight $h$ holds the blades flat face to the wind. Now when the main frame swings rearwardly and downwardly toward the horizontal, from the pressure of the wind, the weight $h$ swings away from the main frame from the combined influences of gravity and centrifugal action and this causes the upper end of the lever G to approach the main frame and turn the free edges of the blades edge wise to the wind. As soon as this takes place, the blades no longer feeling the pressure of the wind, the operating weights E restore the frame to the vertical position. As the frame swings to the vertical position the shifting weight $h$ again changing its relation to the blades, from gravity and centrifugal action, closes the blades flat wise to the wind for a repetition of the former action. In this way the oscillations of the main frame are made continuous by the automatic action of the shifting weight. As the blades are hinged along one edge and come to a flat bearing against the cross bars said blades may be made very thin and light and may project as shown beyond the end of the top of the frame, thereby shortening the latter.

To prevent the blades from being shifted too soon in the stroke the shifting lever and weight are provided with a restraining device which allows the shifting action to take place only as the end of each movement is reached. This consists of a notched metal bar $m$ connected by a pivot to the upper cross bar of the frame just above the fulcrum of the lever. This notched bar is pivoted to the top of the frame to have a slight motion in a vertical plane and runs through a guide $n$ on the lever, see Fig. 1, so that said guide will catch in the notches and hang therein with a frictional engagement up to a certain point in the swing, and then be jerked out of the same to forcibly operate the blades. For this purpose the edges of the notches are made rounding so as to only temporarily restrain the lever.

To throw the motor out of action, the blades are adjusted and held edgewise to the wind by means of a rope $r$ which connects with the shifting lever and extends through suitable guide eyes down through the collar and hollow vertical standard.

I claim

1. A vibrating wind motor, comprising an oscillating frame having a horizontal axis and two downwardly extending arms with weights on the lower ends of the same, shiftable blades on the upper end of said frame, a swinging and weighted lever fulcrumed on the upper end of the frame on an axis parallel to the series of blades to swing in a plane at right angles to the series of blades and having a direct connection with the blades to shift the same from the swing of the lever to and from the blades and a frictional restraining device for holding said lever until the latter part of the stroke.

2. A vibrating wind motor, comprising a frame with two converging side bars with weights attached to their lower converging ends, two cross bars connecting the upper ends, blades hinged at one edge to said cross bars, automatic shifting devices for the blades and an axial shaft located between the weights and the blades.

DANIEL DUNCAN McINTYRE.

Witnesses:
Roy M. Allison,
A. B. Gresham.